INVENTOR.
Thomas A. Banning, Jr.

July 5, 1960 T. A. BANNING, JR 2,943,519
TRANSMISSIONS, AND THE LIKE
Original Filed April 21, 1956 9 Sheets-Sheet 2

INVENTOR.
Thomas A. Banning, Jr.
BY

July 5, 1960     T. A. BANNING, JR     2,943,519
TRANSMISSIONS, AND THE LIKE
Original Filed April 21, 1956     9 Sheets-Sheet 4

INVENTOR.
Thomas A. Banning, Jr.
BY

July 5, 1960   T. A. BANNING, JR   2,943,519
TRANSMISSIONS, AND THE LIKE
Original Filed April 21, 1956   9 Sheets-Sheet 8

INVENTOR.
Thomas A. Banning, Jr.

United States Patent Office 2,943,519
Patented July 5, 1960

2,943,519

TRANSMISSIONS AND THE LIKE

Thomas A. Banning, Jr., 5520 South Shore Drive, Chicago, Ill.

Original application Apr. 21, 1956, Ser. No. 502,947, now Patent No. 2,856,692, dated Oct. 21, 1958. Divided and this application Oct. 15, 1958, Ser. No. 767,333

5 Claims. (Cl. 74—789)

This invention relates to improvements in transmissions, and the like. The present disclosure relates to devices by which two adjoining shafts or other rotary elements may be connected together for drive of the one by the other, or may be disconnected from each other so that the driving element may rotate in either direction without transmission of rotary drive to the other or driven element. In the former case of effecting drive from the driving element to the driven element the two elements are drivingly connected together; in the latter case of discontinuing drive from the driving element to the driven element the two elements are not drivingly connected together. Numerous forms of clutches have been developed, generally to meet specific conditions of operation imposed by the form and intended use of the machine wherein they are included.

Primarily the construction herein disclosed is intended for use in instrumentation units wherein very close tolerances of accuracy of measurements of angular rotations are a requirement. Thus, in measurements of distance by integration of successive relatively small increments of the total distance, with intervening distance elements which are not to be included in the totalizing of the numerous increments, it is evident that even slight losses of measurement or slight unintended additions of distance to the integration of the intended increments, will produce serious over-all errors of integration. Such errors may and in various kinds of operations will be sufficient to make the entire measuring operation worthless.

When the driving and driven elements of a clutch (generally a driving shaft and a driven shaft) are connected together for clutching and disconnected from each other for unclutching, one or the other, or both of the engaging elements of such a clutch must move to or away from a companion element of the line of drive to effect the desired change of clutch condition. Since time is consumed in effecting such change of clutch condition it is evident that whenever one or the other of the driving or driven elements is in rotary movement at the time of such change there will necessarily be a loss of measurement at the driven end of the clutch; and the extent of such loss will be directly proportional to the difference of the rates at which the driving and driven elements are rotating at the time of making the change, multiplied by the time needed to make such change of condition. If the driving and driven elements are, however, in a state of rest at the time of making the change no loss of measurement will occur, which loss is due solely to the conditions above stated.

Due to the above explained characteristic it is evident that when the rates of movement (generally rotation) of the driving and driven elements are slow at the times of making changes of status, the errors introduced by the characteristic above defined will be small, and frequently may be so small that they can be disregarded, even though they may be cumulative. Of course, when the change of clutch status is made at times when the driving and driven elements are stationary, no error will be produced, due to the condition above discussed.

In conventional forms of clutch the clutching and unclutching operations are effected by direct movement of the driving and driven elements towards and from each other. When the engaging surfaces are friction disks or the like with their planar surfaces normal to the axis of rotation it is evident that the torque transmitting ability from driving to driven element is limited by the diameters of the contacting surfaces, the condition of the contacting surfaces, the materials from which such surfaces are formed, and the pressure produced between the contacting surfaces. Furthermore, in such an arrangement provision must be made for producing continuity of such engagement between the driving and driven surfaces at the needed pressure. When such engagement is produced by direct magnetic pull exerted between the element it is generally necessary to retain current on the magnetizing coil during the interval of engagement, sometimes for long periods of time.

In other conventional forms of clutch the driving and driven elements are provided with companion teeth or even small serrations which are brought into engaging registry with each other to produce the clutching action. If, at the instant of shift of one or both elements to the clutching condition such teeth are not in engaging or registering relationship it is evident that an angular move must be produced between the driving and driven elements to bring the teeth into register so that full tooth engagement between the driving and driven elements may be produced. Such angular shift may have a value somewhere between zero and an amount equal to the angular distance between the center lines of successive teeth. In any case an error is produced generally equal, in the overall measuring operation, to the number of clutching operations, multiplied by one-half the angular distance between the center lines of successive teeth. Such an error is generally inadmissible. On the other hand it is highly desirable to use, in many cases, clutches which are tooth engaged between the driving and driven elements for the clutching operation, since such a drive is positive and will completely eliminate slip during the drive.

In Letters Patent of the United States, No. 2,671,346, issued to me Mar. 9, 1954 for Improvements in Measuring and Recording Various Well Drilling Operations, I have disclosed a form of tooth engaged driving and driven element transmission unit. In that disclosure I have shown a differential unit including aligned driving and driven shafts, a gear element secured to the end of each shaft, such gear elements being proximate to each other, and I have also shown a differential "cage" rotatable between the two gears and carrying one or more pinions which engage both of the gears. When such cage is free to rotate the driving shaft and its gear may rotate without drive to the driven shaft and its gear; when such cage is locked against rotation, rotation of the driving shaft and its gear will drive the driven shaft through engagement of its gear with the pinion or pinions of the stationary cage. Thus, the driving and driven shafts are always geared together so that no losses of measurement will occur due to need of bringing teeth into mesh, no movement of either driving or driven element axially during transmission or non-transmission of rotary movement occurs, and to produce transmission operation it is only needed to effect a braking action on the cage so as to hold the same stationary during transmission drive. Contrarily, non-transmission is effected promptly by merely terminating the braking action. Such braking and releasing operations are produced by very slight shifts of the brake shoes.

In that earlier embodiment of such "differential" form of transmission I have also disclosed electro-magnetic means to effect shift of the brake shoes between their released and braking conditions; and I have also, in that case, disclosed arrangements whereby the shifts of the brake shoes are produced by short electrical pulses, with lock of the brake shoes in their braking positions after the transmission pulse is delivered to the unit. Also, in that case there is disclosed means to effect release of the brake shoes by a short electrical pulse to thus produce the desired non-transmitting operation.

In that earlier disclosure the amount of torque to be transmitted from driving to driven shaft was substantial, at least substantial for a device whose prime purpose was to effect cumulative measurements of increments of distance. The present application discloses a modified form of such differential type of unit which modified form is well adapted for use in small size units, intended for transmission of small torque. Furthermore, the differential form of transmission hereinafter disclosed is one which requires but a very small amount of current to effect either transmitting or non-transmitting operation by braking or releasing the cage. Accordingly, the form of transmission hereinafter disclosed is well adapted for use in installations wherein the current consumption must be held to a very low value.

In order to prevent errors of measurement, the measurements being cumulated as the successive increments of rotations of the driven shaft, it is desirable to provide means to lock the driven shaft against rotation without delay when the transmitting action is discontinued. Such locking should be produced by a braking action transmitted directly to the driven shaft, and not by engagement of a pawl or the like with a ratchet connected to the driven shaft, since when the "locking" is effected by engagement of a pawl with a ratchet it is possible to produce a false movement of amount between zero and the full angular embracement of a ratchet tooth. In my aforesaid Letters Patent, No. 2,671,346 I have disclosed a "drag" brake acting on a drum connected to the driven shaft, such drag brake being adjustable as to the amount of drag by adjustment of a spring drawing two brake shoes against opposite sides of the drum. Such drag is always in action, both during intended transmitting operation, and when non-transmitting. Accordingly, the torque needed to effect transmission drive must be sufficient to overcome the drag resistance plus the amount of delivered useful torque of the driven shaft. Such an arrangement is satisfactory in cases where the delivered power or torque may be substantial, but is not satisfactory when the available torque at the driving or input end of the unit is small.

One of the features of the present invention relates to the provision of an arrangement of differential transmission elements in which a brake drum is connected to the driven shaft, and suitable brake shoes are movably mounted for engagement with or disengagement from such brake drum, together with means to actuate such brake shoes simultaneously with the braking actions produced on the differential cage, the arrangement being such that engagement of the cage brake shoes occurs simultaneously with disengagement of the driven shaft drum brake shoes, and vice versa.

In connection with the foregoing objective, it is a further object to produce the brake shoe disengaging movements, for both the differential cage and the driven shaft drum, by alternate rocks of a rock bar, with provision for producing toggle actions on such rock bar to retain such bar in either of its rocked positions by a strong toggle action. By this means it is only necessary to make provision for producing the rock of the bar to a position at or slightly past the toggle reversing position, whereupon the rocking action will be produced by such toggle to complete the rock, and the bar will be retained in its so rocked position without the continued application of outside force, such as current supply.

It is a further object of the invention to provide means to effect the rocks of such rock bar by use of solenoids acting at its ends, so that impulses of current delivered to such two solenoids in alternation will produce the desired rocks in alternation. In this connection it is a further object to provide means to open the current delivery circuit leading to each such solenoid, just prior to completion of the rocking movement produced by such solenoid, so that the current requirements may be reduced to a minimum.

Further objects of the invention are to produce a very simple but rugged design of the unit so that it shall be highly dependable in operation. Also, to make such unit as a self-contained unit, carried by its own base plate, and with provision for properly aligning the input and output shafts by convenient bearing arrangements.

Another feature of the invention relates to the provision of a design and construction of the unit such that the forces exerted by the small springs which urge the brake shoes into braking engagement with the differential cage or the brake drum, as the case may be, may be readily adjusted after the elements of the unit have been fully assembled. Thereby it is possible to bring the unit into best operative condition at the time of original assembly of the unit, and also to make later adjustments from time to time as needed to maintain the unit in proper operative condition. The arrangement is such that the adjustments of such springs may be readily made from the "front" of the unit, and without disturbance to other operating parts.

A further feature of the invention relates to the provision of simple means to enable adjustments of the microswitches (or other forms of switches) by which the currents to the actuating solenoids are cut off at the proper times during the rocks of the rock bar element. The arrangement is such that such microswitch adjustments may be readily made from the front of the unit after such unit has been completely assembled.

A further feature of the invention relates to the provision of a differential unit in which the gears are all of the spur gear type, as distinguished from being bevel gears. This arrangement includes the provision of internal spur gears connected to the input and output shafts and facing each other, together with companion spur gears intermeshed with each other, carried by the cage, and meshing respectively, with the internal gears of the driving and driven shafts. By this means a very sturdy and compact arrangement is provided, and one which is readily assembled.

Other objects and uses of the invention will appear from a detailed description of the same, which consists in the features of construction and combinations of parts hereinafter described and claimed.

This application is a division of my co-pending application for Letters Patent of the United States for improvements in Measuring and Recording Various Well Drilling Operations, Serial No. 502,947, filed April 21, 1956, now Patent No. 2,856,692.

In the drawings:

Figure 2 shows the microswitch terminals;

Figure 5:
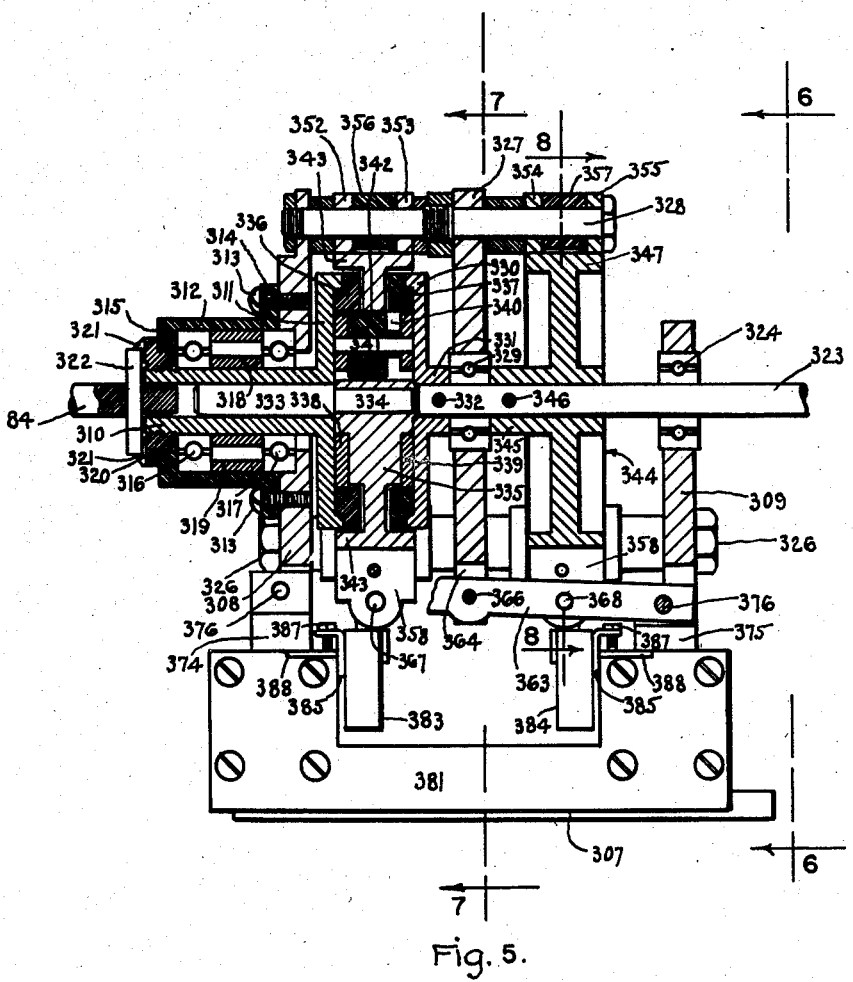
Figure 5 shows a longitudinal section through the unit of Figures 1, 2, 3 and 4, and other figures; and in this figure the left-hand portion of the rock arm has been broken away for clarity of illustration of elements to the rear of such arm; and in Figures 1 and 5 the left-hand shaft is the driving shaft, and the right-hand shaft is the driven shaft.
Figure 8:
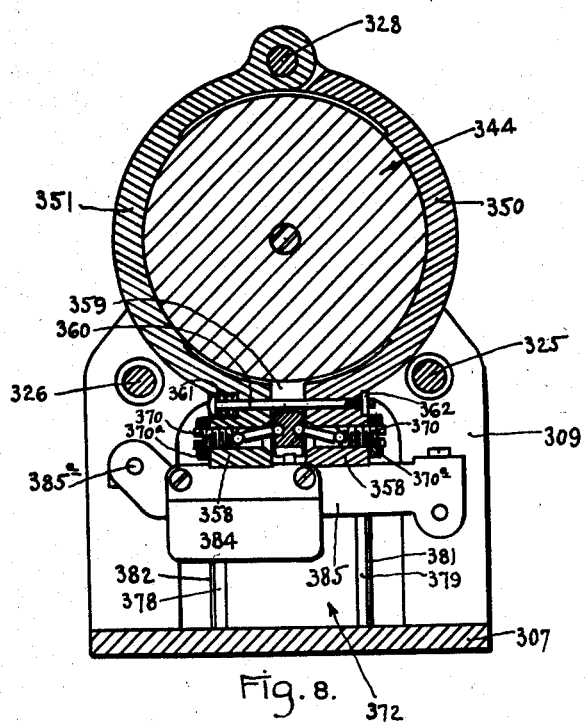
Figures 9, 10:
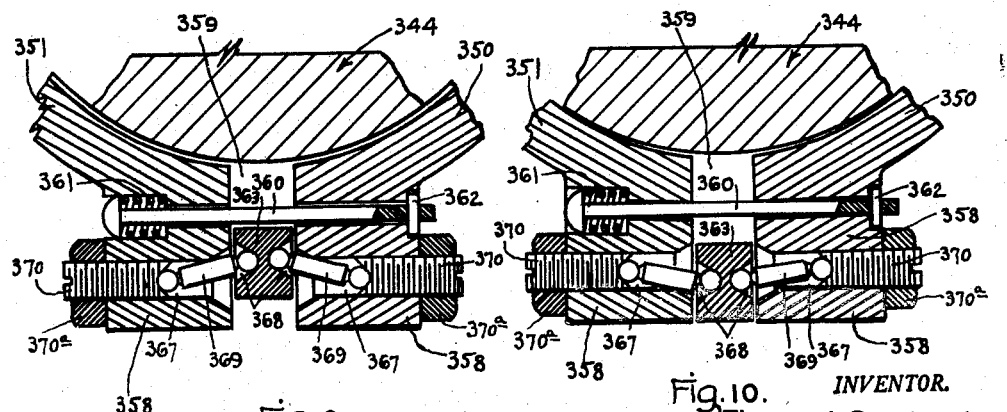
Figure 11:
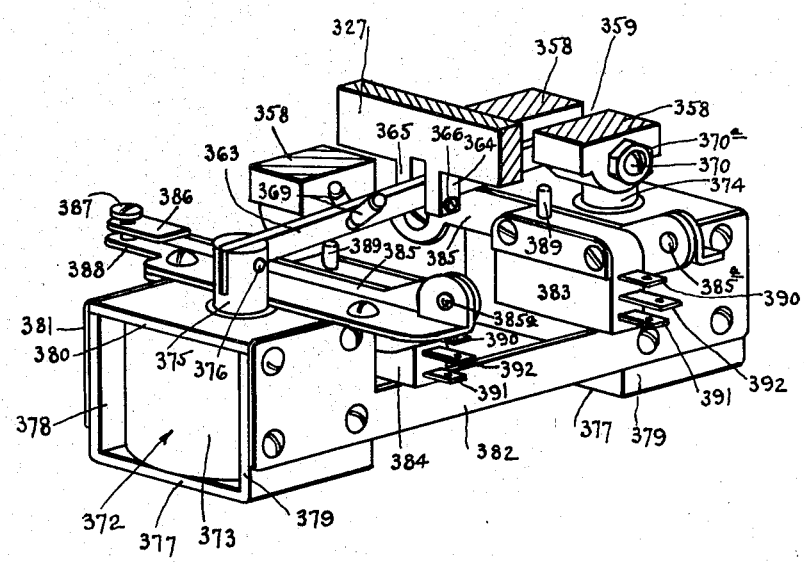

Figure 8, is a cross-section taken on the line 8—8 of Figure 5, looking in the direction of the arrows; and this figure shows the rock arm in cross-section, and shows the small toggle pins which are engaged by such rock-arm and work against the sockets of brake-shoe lugs to force such lugs apart and thus release the brake shoes from the shaft drum on which they exert gripping action at the proper times; and in this Figure 8 the portion of the rock-arm which engages the toggle pins therein is shown in its raised position, thus allowing the toggle pins to tilt upwardly sufficiently to permit the lugs of the brake shoes to be forced together far enough to bring the brake shoes strongly against the shaft drum under spring pressure for the holding action;

Figure 9 shows a fragmentary section corresponding to a portion of Figure 8, but on enlarged scale as compared to Figure 8, and with the parts in the same positions as are shown in Figure 8 to better show the toggle actions produced by the small toggle pins when acted on by the rock arm at the location where said pins engage sockets of that rock arm;

Figure 10 shows a view similar to that of Figure 9, but with the rock arm in its reversed position, to thus cause the small pins to have their inner ends shifted down and beyond dead-center position, with corresponding forced separation of the brake shoe lugs sufficiently to release the brake shoes from the shaft drum, and in this figure the pins have had their inner ends moved down far enough to produce a toggle locking action, having moved past dead-center so that the brake shoes will be held in their non-gripping positions; and Figure 11 shows a perspective rear view of the rock-arm and the solenoid operating elements therefor, and the microswitch for the far side of the structure, the brake-shoe lugs, the small toggle pins for the near side of the structure, and other related elements, being on enlarged scale as compared to other figures.

The present transmission unit includes the base plate 307 from which there stand the left and right hand end bracket plates 308 and 309, respectively. The driving shaft in the present case comprises the sleeve 310 having at its inner end the disk 311. A hollow extension 312 is secured to the left-hand bracket plate 308 by the screws 313 passed through the flange 314 of such extension. This extension has at its outer end the inwardly extending flange or rib 315. Double or two ball bearings 316 and 317 are seated within this extension, the outer raceways of such bearings being set into the extension and between the rib 315 and the outer face portion of the bracket plate 308. The inner raceways of these bearings are set onto the sleeve 310 to thus journal such sleeve within the extension. Spacer rings 318 and 319 are set between the inner and outer raceways of these bearings to ensure proper spacing between the bearings.

The sleeve 310 is driven in convenient manner from the input shaft or other input element. By way of illustration such input shaft is shown at 8' in Figure 5. The ring shaped nut 320 is threaded onto the end of such sleeve, such nut extending through the flange or rib 315 of the extension and into engagement with the inner raceway of the left-hand ball bearing, but without jamming against the end of the rib of the extension or rotating in such extension with friction. The outer end of this nut is provided with a crosswise extending groove 321. The right-hand end of the input shaft 84 extends into the sleeve with a loose fit, and a drive pin 322 is extended through such shaft at a point where the pin will engage the cross groove 321. Thus such pin provides a loose coupling drive from the shaft 84 to the sleeve, the looseness of which is sufficient to take care of slight misalignment between the transmission shafts and the input shaft 84. It is also possible, with this arrangement to withdraw the unit directly to the right without having to draw the pin from the shaft 84 since the groove 321 is open at its left-hand face.

Figure 7:
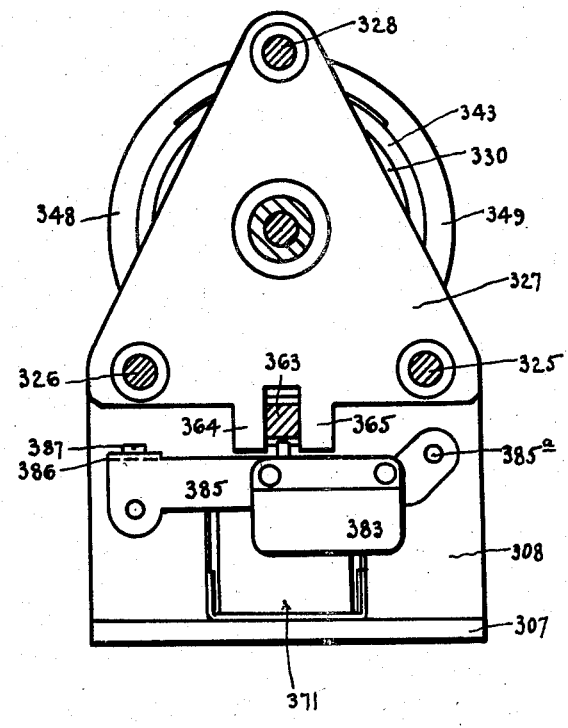
Figure 7 shows a cross-section taken on the line 7—7 of Figure 5, looking in the direction of the arrows; and this figure shows the rock arm which carries the microswitch at one side of the unit, and also shows the means to adjust such rock arms to bring the microswitch operating stud into correct adjustment for microswitch throw at the proper time in the transmission changing movements.

The driven shaft 323 extends through the right-hand bracket plate 309 where it is journalled by the ball bearing 324. Rods 325 and 326 are extended through the front and back portions of the bracket plates somewhat below their half-heights. A central partition plate 327 of generally triangular form, as shown in Figure 7 has its lower corners set onto these rods, and its apex extends substantially to the elevation of the left-hand bracket plate 308. A rod 328 extends through the apex of this partition plate and through the left-hand bracket plate, and overhangs a considerable distance to the right of the partition plate as shown in Figure 5. The driven shaft 323 extends leftwardly through this partition plate in which it finds bearing by the ball bearing element 329. This driven shaft then extends a slight distance leftwardly towards the disk 311 of the sleeve 310.

A disk 330 having the short hub sleeve 331 is set onto the left-hand end of the driven shaft, to which said disk is pinned by the cross pin 332. It thus appears that the opposing disks 311 and 330 are drivingly connected to the driving and driven shafts, respectively.

A centering and journalling rod 333 is set into the inner end portion of the sleeve 310, and at the point where such rod emerges from such sleeve it is of reduced size as shown at 334. This reduced size portion 334 provides a journal whereon the "cage" element 335 of the differential is rotatably mounted. This cage element includes a peripheral flange or cylinder surface against which the brake shoes presently to be described are gripped when the cage is to be held stationary for transmission of drive to the driven shaft. The thickness of this cage element is stepped as shown in Figure 5 so that its central portion is of full width, with somewhat reduced width section extending out about two-thirds of the wheel radius where a further reduction of the thickness occurs to accommodate the ring gears. The outer flange portion is then of full width to provide the brake cylinder. The internal ring gears 336 and 337 are secured to the disks 311 and 330, respectively, being well held exactly concentric with such disk elements by the facial recesses formed in such disks as shown in Figure 5. These ring gears may be held in position by screws set through the disks and into the outwardly facing surfaces of the ring gears, such screws not showing in Figure 5. Seated against the faces of the cage in its next thicker portion are the circular plates 338 and 339. These plates lie within the ring gears and are held in place by screws, not shown in Figure 5. It will thus be seen that such plates and the body of the cage comprise a unit of substantially the full width clearance between the inside faces of the disks 311 and 330.

At one or more locations within the body of the cage there are provided circular openings extending through the cage body between the proximate faces of the plates 338 and 339. Each of these openings comprises two merging cylindrical sections whose axes are parallel to the axis of the shaft rotation. (Only one of these cylindrical sections is shown in Figure 5, numbered 340.) There is a cross pin extending lengthwise through each such cylindrical section centrally thereof, the pin for the opening 340 being numbered 341. Each of these pins is end supported by the plates 338 and 339 and constitutes a journal support for a spur gear such as shown at 342 in Figure 5. Since each of the openings 340 comprises two merging sections, with a cross pin extended across each section, and with a spur gear journalled on each such cross pin it is evident that the two spur gears of such two merging sections may be meshed together so that they must rotate in opposite directions. Examination of Figure 5 will show that the gear 342 there shown is of body width and tooth width to reach only across the central portion of the cage, but does not come to the location of the opposite internal gear 337. It does, however, mesh with the internal gear 336. The spur gear in the other section of the pair does however, mesh with the internal gear 337, and also with the first mentioned spur gear; but this second spur gear does not extend leftwardly into meshing engagement with the internal gear 336.

Figure 4:
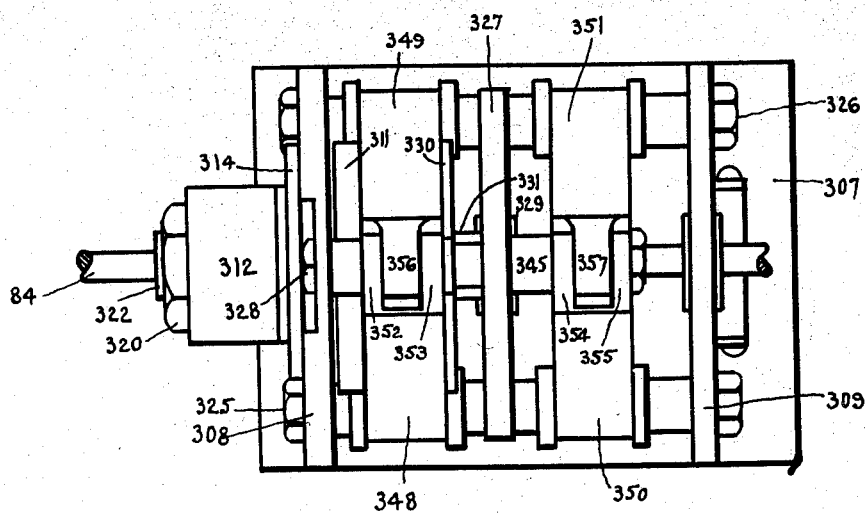
Figure 4 shows a plan view of the unit of Figures 1, 2 and 3 and other figures.

With the above described arrangement it is evident that both of the disks 311 and 330 are connected positively together by gears and a gear train which includes the pinions journalled into the cage. It is also evident that by locking that cage stationary the driving disk will positively drive the driven disk but in opposite direction due to the inter-meshing of the two cage carried pinions, the ratio of drive between the driving and driven disks being one to one. It is also evident that by releasing the cage and locking the driven disk against rotation the cage will rotate in the same direction as the driving disk but at reduced speed. I have provided various controls to produce desired operations, which controls are as follows:

The peripheral circular flange 343 of the cage comprises a brake cylinder which may be engaged by suitable brake shoes to hold the cage against rotation or may be released to allow such cage to run free. There is a brake wheel 344 located on and keyed to the driven shaft 323. This wheel includes the hub portion including the sleeve 345 which is pinned to the shaft by the cross pin 346. This brake wheel is provided with the circular peripheral flange 347 which may be engaged by brake shoes to retain the driven shaft stationary when the non-transmitting condition exists. Evidently the engaging of the brake shoes for the cage to produce transmitting action and to produce drive of the driven shaft must be accompanied by disengagement of the brake shoes from the wheel 344 to allow the driven shaft to rotate. Conversely, release of the brake shoes from engagement with the cage to produce non-transmitting operation must be accompanied by engagement of the brake shoes with the brake wheel of the driven shaft to ensure immediate stoppage of rotation of that shaft and to retain said shaft against untoward rotation by various influences. There are provided the two companion brake shoes 348 and 349 for the cage, and the similar companion brake shoes 350 and 351 for the brake wheel. As well shown in Figures 1 and 4, the upper or pivoted ends of the shoes 348 and 350 are bifurcated to provide the companion ears 352 and 353, and 354 and 355, for the two shoes; and the upper pivoted ends of the shoes 349 and 351 are provided with central lugs 356 and 357 which set between the pairs of ears of the companion brake shoes. All of such lugs and ears are pivotally mounted on the rod 328 which extends parallel to the driving and driven shafts. The several brake shoes are of generally semi-circular form as well shown in Figure 8 and they reach around their respective cage or wheel surfaces to locations below such cage and wheel where their braking operations are controlled. Preferably also these brake shoes are slightly relieved in their upper and lower portions to provide cage and wheel engaging surfaces of approximately ninety degrees embracement against the cage and wheel respectively, as shown in Figure 8. By this means very strong and effective braking actions are produced against the cylindrical surfaces to be gripped.

Referring to Figures 8, 9 and 10 the details of construction of these brake shoes are shown. Each brake shoe is provided with a depending lug 358 on its lower end, and the companion shoes of each pair are so proportioned that when gripping action is to occur the lugs and the lower proximate portions of the companion shoes do not come together but a narrow space 359 is then left between the lugs. A tension rod 360 is extended horizontally through the two lugs of each pair of brake shoes. A small but stiff spring 361 is set onto the rear end of each such tension rod, which rear end is enlarged to abut the spring end, the front end of each spring bearing against the proximate brake shoe lug 358. Conveniently the brake shoe lugs are recessed to receive these springs as shown in Figures 8, 9 and 10. The front ends of the tension rods carry nuts 362 by which the spring compressions may be adjusted by drawing the tension rods forwardly to a greater or less extent with corresponding adjustment of the spring lengths. These springs and tension rods normally retain the brake shoes of each pair in strong enough engagement with the corresponding cylindrical surfaces to ensure sufficient holding of the cage or the driven shaft, as the case may be, against improper rotative movement.

Referring to Figures 1, 2, 5, and 7 to 11, inclusive, a horizontal rock bar 363 has its central portion pivoted between the lugs 364 and 365 which extend down slightly from the lower edge of the triangular frame plate 327, such pivoting being provided by the pin 366. The end portions of this rock bar extend between the pairs of lugs 358 of the brake shoes proximate to such bar ends, so that as the bar is rocked through a small angle its two ends move in opposite vertical directions. Thus, during one rock the bar end between the brake shoe lugs at the cage end will move down while the bar end between the brake shoe lugs at the wheel end will move up; during the return rock of the bar its ends will move in contrary directions.

Examination of Figures 9 and 10 in particular reveals the through openings 367 extending through each of the brake shoe lugs below the location of the tension rod 360 of such lugs. The end portion of the bar 363 which rides between each pair of brake shoe lugs is provided on its two faces with small recesses 368 to receive rounded ends of small pins 369. A set screw 370 is screwed into the opening 367 of each lug from the outer face of such lug, the inner end of each set screw being recessed to receive the proximate rounded end of the corresponding pin 369. By setting these set screws 370 into the lugs greater or less distances it is evident that prying actions will be produced by the pins against the corresponding brake shoe lugs as the lever 363 is rocked in the two directions of rock. It is intended that down movement of either end of the lever shall produce separation of the brake shoes, such down movement being produced by a corresponding solenoid presently to be explained. It is also intended that when such down movement has been executed, forcing the brake shoes slightly apart to release the braking action, a toggle effect shall be produced by the then positions of tilt to which the small pins 369 have then been shifted, so that the lever will be effectively retained in such position of tilt until a succeeding lever tilting operation shall be produced by excitation of another solenoid. It is noted that during the down movement of the lever end portion the brake shoes are being separated against the force of the corresponding spring 361 to discontinue the brake action, and that when the lever passes dead center position of the small pins a slight returning movement of the lugs 358 occurs, but that returning movement is not enough to again bring the brake shoes into frictional engagement with the cage or the brake wheel as the case may be. Figure 9 shows the parts in their positions during brake shoe holding operation; Figure 10 shows the parts during brake shoe releasing operation. It is seen that in Figure 9 the lever stands considerably above the line between the outer ends of the small pins, whereas in Figure 10 the lever stands only slightly below the line between the outer ends of the small pins. Accordingly, a much greater separating action takes place between the brake shoe lugs during the movement to dead center position than afterwards occurs during slight movement past dead center. Thus the brake shoes are retained properly in condition of separation from the cage or the brake wheel, as the case may be. It is also seen that this simple arrangement of parts is such that the setting of the brake on the cage and the releasing of the brake on the brake wheel occur at substantially the same time; and likewise that releasing the brake on the cage and setting of the brake on the brake wheel occur at substantially the same time. Also, that such operations are produced by simple rocks of the lever.

Figure 1:
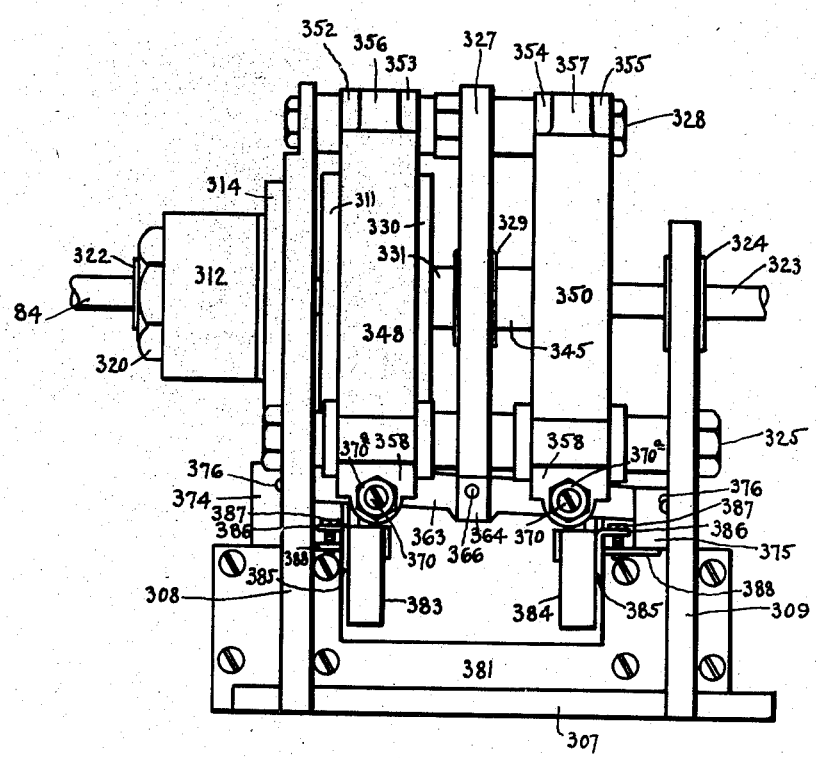
Figure 1 shows a front elevational view of the unit of the present invention.
Figure 2:
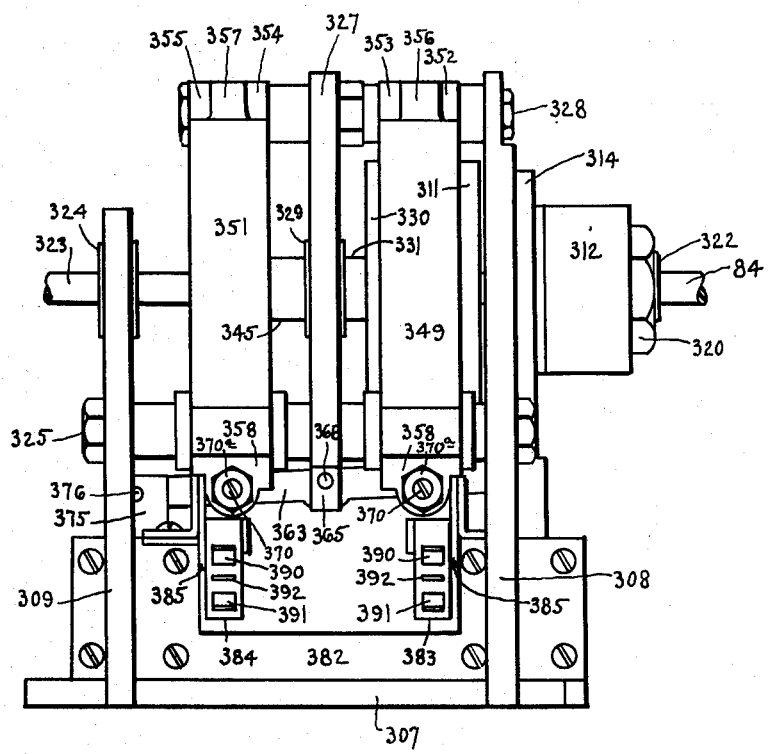
Figure 2 shows a rear elevational view corresponding to Figure 1.

The solenoids 371 and 372 are located on the base plate 307 beneath the driving and driven end portions of the lever or rock arm 363, respectively. These solenoids are preferably of the iron-clad type to develop strong pulls with a minimum of solenoid size. To this end each solenoid includes its wire carrying spool 373 (see Figure 11) providing a vertical tubular opening into which works its armature with up and down movements. The armatures for the two solenoids are shown at 374 and 375 (see Figure 11). The upper ends of these armatures are cross-slotted to receive the ends of the rock arms or lever with pin connections, 376, to take care of needed angularity during rocks. In Figure 1 the left-hand end of the rock arm has been raised by energization of the right-hand solenoid, 372, and consequent down movement of the armature at the right-hand end of the device. Such movement has served to permit the brake shoes of the cage to grip that cage and thus produce the desired transmitting operation. At the same time such rock of the lever has forced the brake shoes of the brake wheel to separate thus permitting the driven shaft to rotate under drive from the driving shaft. The succeeding impulse of current must therefore energize the left-hand solenoid 371 to discontinue transmission.

Figure 3:
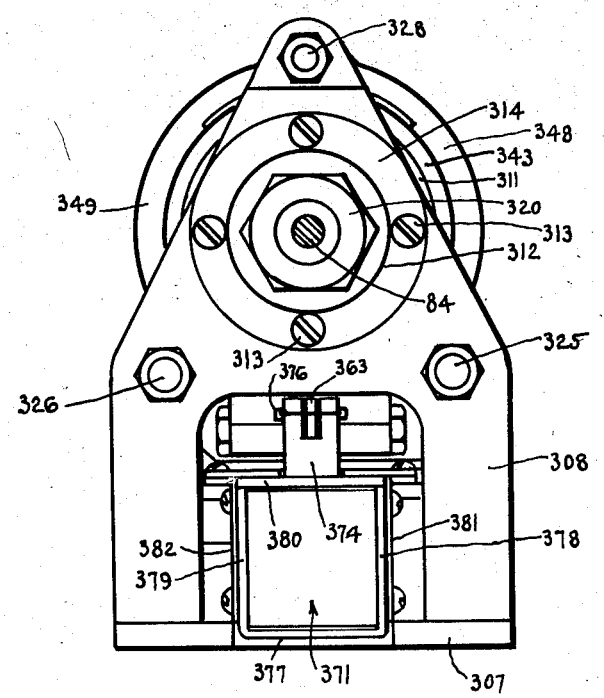
Figure 3 shows a left-hand end elevation corresponding to Figure 1, being the driving or input end of the unit.
Figure 6:
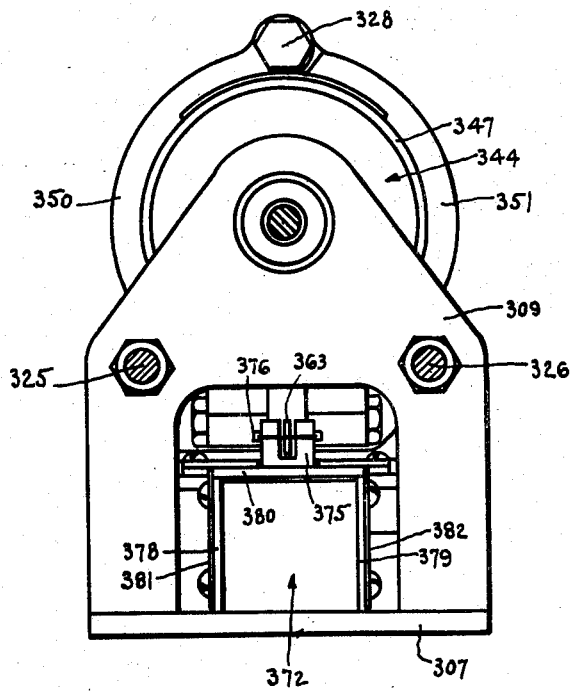
Figure 6 shows a right-hand end elevation of the unit shown in Figures 1 to 5, inclusive.

As shown in the drawings, each solenoid is provided with a U-shaped enclosure, 377, of magnetic material, the arms 378 and 379 of such U-element being carried up at the front and rear faces of the solenoids as well shown in Figures 3, 6 and 11. A top piece 380, also of magnetic material, engages the upper ends of the arms 378 and 379, and is provided with a central opening to pass the vertically movable armature.

Conveniently a plate of non-magnetic material, 381 is placed against the front faces of the U-arms 378 of both magnets or solenoids, and a corresponding plate, also of non-magnetic material, 382, is placed against the back faces of the U-arms 379 of both solenoids. These front and back plates retain the solenoids securely against displacement or distortion, and ensure good functioning of the solenoids by the impulses delivered to them. These front and back plates are of course secured to the solenoid elements by screws as indicated in various of the figures. The bottom portions of the U-shaped iron-clad ding elements may be suitably secured to the base plate as by screws or the like.

It is desired that as the rock arm 363 effects each tilting movement by energizing of one of the solenoids the current delivered to that solenoid shall be of very short duration and in the nature of an impulse. However, the delivery of currents to these solenoids will generally be governed by the alternate throws of a control switch, generally of the two position type, such as a microswitch having two stationary contacts between which a biased leaf contact snaps. Such switch may, in the case of a transmission comprising a portion of equipment used in various well drilling measurements, comprise a portion of or be operated by the dead-line of the tackle lacing of the drilling operation, or may comprise a portion of the measuring devices. In any case, however, when such switch is moved to either of its two contact positions it will remain there until such switch is reversed. Thereupon it will remain in its so reversed position until the time arrives for return to its first mentioned condition, where it will again remain until the next switch reversal occurs. Thus in each case a circuit is completed through that portion of the circuit elements which includes the so engaged contacts, and such circuit will continue in its closed condition until switch reversal occurs, provided no other circuit interrupting means is provided. That circuit interrupting means is provided in the form of a small microswitch comprising a portion of the transmission unit and in position to be actuated by the down throw of each end of the rock arm 363. These microswitches are shown in Figures 1, 2, 5, 7 and 11. They are shown at 383 and 384 corresponding to the solenoids 371 and 372, respectively. These microswitches are conveniently carried by light plates or bar sections 385 having their rear ends pivotally connected to portions of the rear plate 382 so that by slightly rocking such sections 385 up or down the microswitches may also be brought to exact positions of adjustment vertically. The front portions of these sections 385 are provided with ears 386 carrying the adjusting screws 387 which work against other ears 388 carried by the front plate 381 so that by manipulation of the screws the front end portions of the pivoted plates may be raised or allowed to be lowered slightly. The desirability of these adjustments arises from the following relationship of parts:

Each microswitch is provided with the switching control stud 389 (see Figure 11) projecting slightly above the top face of such switch. When the biased leaf contact is in its normally biased condition this stud is fully projected to its highest point, and this represents one definite contacting position of the switch. By depressing such stud 389 slightly the biased leaf contact is reversed, thus producing the other definite switch contacting position. Upon releasing the stud it will be again raised by the biased leaf contact and the original and normal contacting position will be restored. These microswitches are set at such elevations by use of the adjustments already explained, that the stud of each switch will be engaged by the lower edge of the rock arm 363 during descent of the proximate end portion of that arm, and the adjustments are such that switch throw shall occur at or preferably slightly after the proximate portion of the rock arm passes through the dead-center position at which the corresponding small pins 369 reverse their arm rocking forces. Thus, once having moved the rock arm to such dead-center position the rock arm will be continued in its movement to termination of such movement both by the toggle effect produced by the small pins 369 and by the momentum effect developed by rapid movement of the rock arm itself. (Additionally, it is noted that a further toggle effect is also produced by the small pins at the other end of the rock arm, since these shall also pass their dead-center positions during up rock of the rock arm at about the same time as the down rock is occurring at the location of the so-energized solenoid.)

Now the microswitches shown are of the type including two stationary contacts 390 and 391 (see Figures 2 and 11), together with the intermediate biased leaf contact 392. (In said figures the elements so legended by numerals are the terminals of the contacts, which contacts themselves are contained within the microswitch housing.) Various circuits involving transmissions of the type herein fully disclosed are shown in said parent application and Letters Patent, of which the present case is a division. Thus I do not deem it necessary to illustrate or describe such specific uses in detail. It is, however noted that units embodying the inventive features herein disclosed may find useful application in many devices and combinations of elements, and for many purposes.

The following comments concerning certain operative characteristics of the herein disclosed differential type of clutch are pertinent:

When the cage is locked to produce transmission action the pinions 342 (only one of which is shown in Figure 5) must rotate under drive of the internal gear 336 to effect drive of the driven internal gear 337. The rate of rotation of these pinions 342 will then be proportional to the rotary rate of the driving internal gear 336 multiplied by the ratio of the pitch diameter of such internal gear divided by the pitch diameter of the pinion 342. In various measuring operations the rotative rate during measuring (transmitting) is slow so that the rotative rates of the pinions will be correspondingly small. When the cage is unlocked to discontinue transmitting, with the driven internal gear 337 locked stationary the cage will rotate freely in the same direction as the driving internal gear 336, but at one-half speed (the internal gear 337 being stationary). Under these conditions the pinions will rotate at one-half the speed they would have rotated with the cage locked and the driving shaft rotating at the assumed speed.

The torque to be transmitted through such a unit when used for measuring operations is generally small, since it is not intended to transmit power as such, but only measurements. Acordingly, it is generally not necessary to make provision for lubricating the gears of the differential, but they may be allowed to run dry. However, if desired, suitable lubrication may be provided for these elements, or they may be made of materials not requiring lubrication.

I claim:

1. In a transmission unit, the combination of aligned input and output shafts, means to journal said shafts in alignment with each other and with their proximate ends adjacent to each other, a gear secured to the end portion of each shaft, both gears being of substantially the same pitch diameter, a cage element journalled between the two gears co-axially with the shafts and gears, sprocket means journalled in the cage and intermeshing with both gears, a first brake surface element connected to the cage, a second brake surface element connected to the output shaft, a first brake element proximate to the cage brake surface element, means to move said first brake element against and away from braking engagement with the cage brake surface, a second brake element proximate to the output shaft brake surface element, means to move said second brake element against and away from braking engagement with the output shaft brake surface element, and means to simultaneously move one of said brake elements into braking engagement with the brake surface proximate thereto and the other brake element into non-braking relation to the brake surface proximate thereto, wherein the first brake element comprises at least one brake shoe and means to pivot said brake shoe in proximity to the cage brake surface for rocking movement into braking engagement with the cage brake surface or disengagement from such surface, and wherein the second brake element comprises at least one brake shoe and means to pivot said brake shoe in proximity to the output shaft brake surface for rocking movement into braking engagement with the output shaft brake surface or disengagement from such surface, and wherein there is spring means urging engagement of the first mentioned brake shoe with the cage braking surface and spring means urging engagement of the second mentioned brake shoe with the output shaft braking surface, together with a toggle means in connection with each such brake shoe, each such toggle means having a first shoe disengaging position and a second shoe braking position, and being constituted to rock the corresponding brake shoe away from braking engagement with the corresponding braking surface against the urge of the corresponding spring means when such toggle means is in its first toggle position, and to permit movement of such brake shoe into braking engagement with the corresponding braking surface under the urge of the corresponding spring means when such toggle means is in its second position, together with means to simultaneously shift both of the toggle means from one toggle position to the other toggle position, and wherein said means to simultaneously shift both of the toggle means from one toggle position to the other toggle position comprises a rock arm, means to pivot said rock arm for rocking movement about a pivotal point between the two toggle means for simultaneous raising of one end portion of such rock arm and lowering of the other end portion of such rock arm, together with connections between the end portions of such rock arm and the proximate toggle means, each such connection being constituted to move the corresponding toggle means to its first defined brake shoe disengaging position when the corresponding end portion of the rock arm is in its lowered position, and to move such toggle means to its second defined brake shoe engagement permitting position when the corresponding end portion of the rock arm is in its raised position.

2. A device as defined in claim 1, together with means in connection with each end portion of such rock arm to move such end portion downwardly with simultaneous raising of the other end portion of such rock arm.

3. A device as defined in claim 2, wherein each such rock arm end portion downward moving means comprises a solenoid and a companion armature, together with a tension connection between each such armature and the proximate rock arm end portion.

4. A device as defined in claim 3, together with a microswitch in proximity to each such solenoid, and including a stationary contact and a biased spring leaf contact normally in biased spring raised position engagement with such stationary contact, electrical connections to deliver current to such biased leaf spring contact of each microswitch, electrical connections from the stationary contact of each microswitch to one end of the corresponding solenoid, and an actuating element in connection with the biased spring leaf contact of each microswitch and having a part in position for engagement by the rock arm when such rock arm end portion proximate to such microswitch moves to its lowered position under tension urge of the corresponding armature for movement of the biased spring leaf contact away from engagement with the corresponding stationary contact.

5. In a transmission unit, the combination of aligned input and output shafts, means to journal said shafts in alignment with each other and with their proximate ends adjacent to each other, a gear secured to the end portion of each shaft, both gears being of substantially the same pitch diameter, a cage element journalled between the two gears co-axially with the shafts and gears, sprocket means journalled in the cage and intermeshing with both of the gears, a first brake surface element connected to the cage, a second brake surface element connected to the output shaft, a first brake element proximate to the cage brake surface element, means to move said first brake element against and away from braking engagement with the cage braking surface, a second brake element proximate to the output shaft brake surface element, means to move said second brake element against and away from braking engagement with the output shaft brake surface element, and means to simultaneously move one of said brake elements into braking engagement with the brake surface proximate thereto and the other brake element into non-braking relation to the brake surface proximate thereto, wherein the first brake element comprises at least one brake shoe and means to pivot said brake shoe in proximity to the cage brake surface for rocking movement into braking engagement with the cage brake surface or disengagement from such surface, and wherein the second brake element comprises at least one brake shoe and means to pivot said brake shoe in proximity to the output shaft brake surface for rocking movement into braking engagement with the output shaft brake surface or disengagement from such surface, and wherein there is spring means urging engagement of the first mentioned brake shoe with the cage braking surface and spring means urging engagement of the second mentioned brake shoe with the output shaft braking surface, together with a toggle means in connection with each such brake shoe, each such toggle means having a first shoe disengaging position and a second shoe braking position, and being constituted to rock the corresponding brake shoe away from braking engagement with the corresponding braking surface against the urge of the corresponding spring means when such toggle means is in its first toggle position, and to permit movement of such brake shoe into braking engagement with the corresponding braking surface under the urge of the corresponding spring means when such toggle means is in its second position, together with means to simultaneously shift both of the toggle means from one toggle position to the other toggle position, and wherein the first and second defined brake elements each include two brake shoes both pivoted in proximity to the corresponding brake surfaces, and wherein the spring means corresponding to each brake surface brake shoe means comprises a spring acting on both of the brake shoes of the corresponding defined brake element to urge simultaneous brake shoe movement of both brake shoes against the corresponding brake surface, and wherein each toggle means is constituted to act against both such brake shoes corresponding thereto, for simultaneous rock of both brake shoes away from the corresponding brake surface when such toggle means is in its first defined position, and to permit both such brake shoes to move into braking engagement with such brake surface under such spring urge when such toggle means is in its second defined position.

References Cited in the file of this patent

UNITED STATES PATENTS

| | | |
|---|---|---|
| 802,175 | Seely et al. | Oct. 17, 1905 |
| 1,406,119 | Watanabe | Feb. 7, 1922 |
| 2,695,533 | Pollard | Nov. 30, 1954 |
| 2,806,389 | Rosenthal et al. | Sept. 17, 1957 |